(12) United States Patent
Verhoff et al.

(10) Patent No.: US 7,841,852 B2
(45) Date of Patent: Nov. 30, 2010

(54) APPARATUS FOR DEMOLDING BUILDING PRODUCTS FROM A MOLD

(75) Inventors: Jonathan M. Verhoff, Reynoldsburg, OH (US); Richard Smith, Napa, CA (US); James S. Belt, Utica, OH (US); David P. Aschenbeck, Newark, OH (US); Thomas P. Copeland, Heath, OH (US)

(73) Assignee: Owens-Corning Fiberglas Technology, Inc., Summit, IL (US)

( * ) Notice: Subject to any disclaimer, the term of this patent is extended or adjusted under 35 U.S.C. 154(b) by 994 days.

(21) Appl. No.: 11/323,718

(22) Filed: Dec. 30, 2005

(65) Prior Publication Data

US 2007/0152376 A1 Jul. 5, 2007

(51) Int. Cl.
 *B29C 41/42* (2006.01)
 *B28B 13/06* (2006.01)
(52) U.S. Cl. ............... 425/439; 425/440; 425/444; 425/436 RM; 264/297.3; 264/313; 264/318; 264/334; 198/508; 198/635; 198/642; 198/715
(58) Field of Classification Search ............. 264/297.3, 264/313, 318, 334; 425/439, 440, 444, 436 RM; 198/508, 635, 642, 715
See application file for complete search history.

(56) References Cited

U.S. PATENT DOCUMENTS

| | | | |
|---|---|---|---|
| 1,469,819 A | 10/1923 | Ruby | |
| 1,668,118 A | 5/1928 | Mayone | |
| 3,061,904 A | 11/1962 | Wise | |
| 3,142,106 A | 7/1964 | Wise et al. | |
| 3,348,279 A | 10/1967 | Shoe | |
| 3,718,524 A * | 2/1973 | Bright | 156/500 |
| 3,720,493 A * | 3/1973 | Borcoman et al. | 425/111 |
| 3,770,360 A | 11/1973 | Shoe | |
| 3,812,964 A * | 5/1974 | Woodruff | 209/555 |
| 3,844,524 A * | 10/1974 | Fisher et al. | 249/120 |
| 3,870,777 A | 3/1975 | Jakel | |
| 4,080,688 A * | 3/1978 | Oellers | 19/204 |
| 4,510,165 A * | 4/1985 | Caridis et al. | 426/439 |
| 4,782,652 A * | 11/1988 | White | 56/341 |
| 4,934,513 A * | 6/1990 | Kirkpatrick et al. | 198/612 |
| 5,323,505 A * | 6/1994 | Montabaur et al. | 15/179 |
| 5,411,279 A * | 5/1995 | Magid | 280/47.38 |
| 5,783,135 A * | 7/1998 | Smith et al. | 264/313 |
| 6,644,463 B2 * | 11/2003 | Mott | 198/496 |
| 6,827,570 B2 | 12/2004 | Sumrall | |
| 2005/0045452 A1 * | 3/2005 | Iseli | 198/813 |
| 2007/0096369 A1 * | 5/2007 | Webb et al. | 264/334 |

FOREIGN PATENT DOCUMENTS

| | | | |
|---|---|---|---|
| GB | 863616 | * | 3/1961 |
| GB | 1498833 | * | 5/1975 |
| GB | 1 498 833 | | 1/1978 |
| JP | 04 052374 | | 2/1992 |

* cited by examiner

*Primary Examiner*—Richard Crispino
*Assistant Examiner*—Martin Rogers
(74) *Attorney, Agent, or Firm*—MacMillan, Sobanski & Todd, LLC

(57) ABSTRACT

A demolding apparatus for removing molded building products from a mold has a conveyor assembly to advance the mold in a machine direction. A removal mechanism contacts a dislodged portion of the molded building product and applies a dislodging force to the dislodged portion of the molded building product.

18 Claims, 5 Drawing Sheets

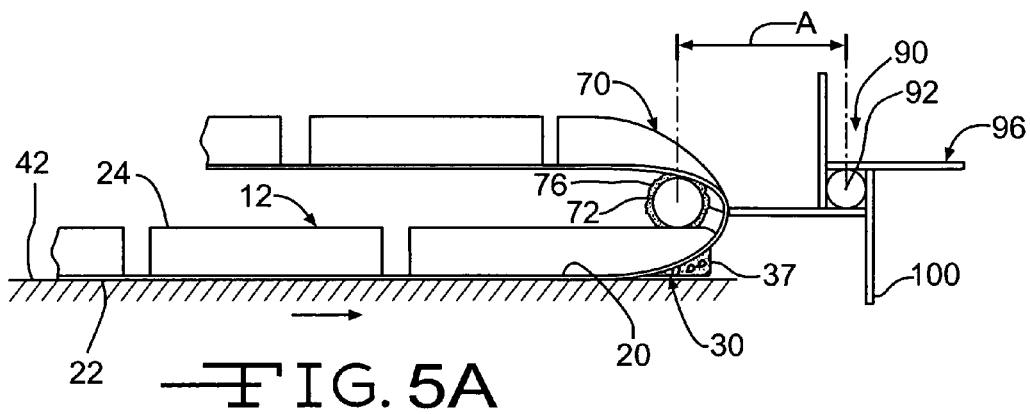
FIG. 5A
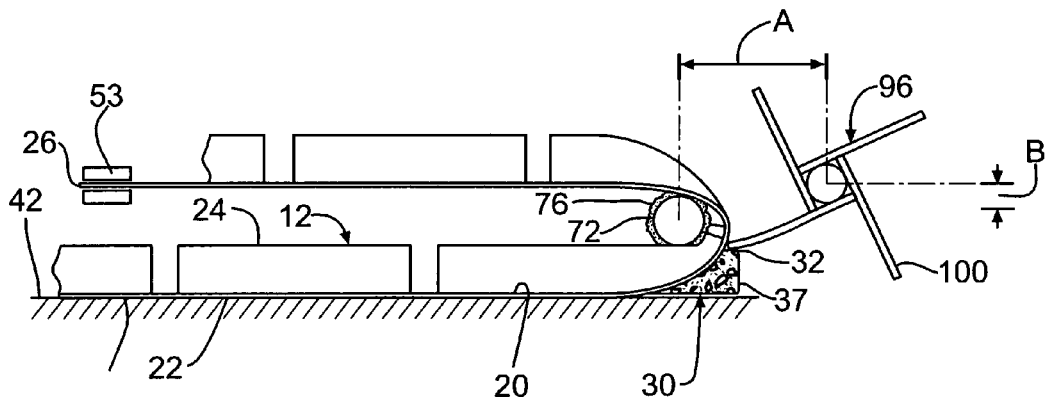
FIG. 5B
FIG. 5D
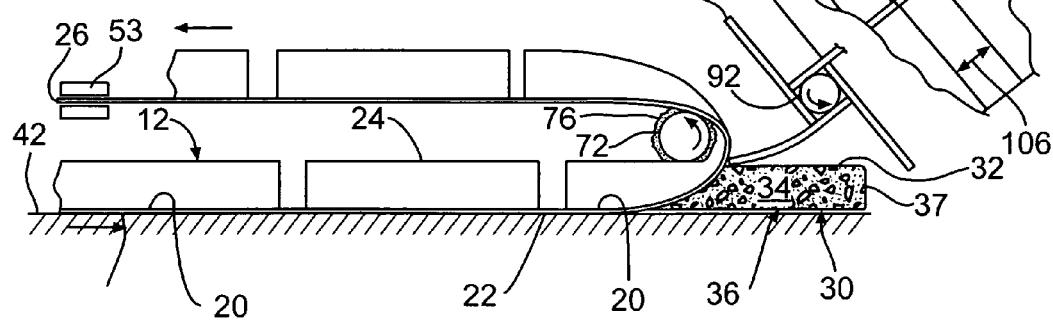
FIG. 5C

APPARATUS FOR DEMOLDING BUILDING PRODUCTS FROM A MOLD

TECHNICAL FIELD AND INDUSTRIAL APPLICABILITY OF THE INVENTION

The present invention relates to an apparatus useful for removing, or demolding, manufactured simulated building products from a mold.

BACKGROUND OF THE INVENTION

Simulated stone molded building products include simulated stone veneers which are used as a lightweight veneer facing on masonry and on metal framed or wood framed construction for architectural aesthetics. The simulated molded building products can be used for exterior applications such as building walls or interior applications such as fireplaces. Simulated building products include capstones, hearthstones, keystones, trim stones and the like. The simulated stone building products are usually lower in cost than the natural stones that they replace. CULTURED STONE® products are simulated stone products manufactured by the Cultured Stone Corporation, a division of Owens Corning, Napa, Calif. The CULTURED STONE® product line includes hundreds of designs of precast stone veneers and architectural trim products that replicate an extensive variety of textures, sizes, shapes and colors of natural stone and non-natural stones (including but not limited to bricks or brick veneer), i.e., colors that do no occur in nature. The simulated stone products are manufactured using molds taken from natural stones. The molds generally include a flexible layer having at least one mold cavity that is filled with a castable material. The castable material is cured, or set, and formed into the simulated building product.

The building product removal process, however, can be especially difficult and often expensive due to the amount of manual labor needed to remove the simulated building product from the mold without damaging either the building product or the mold. In situations where the mold has more than one type of shaped mold cavity it is especially difficult to efficiently and safely remove each type of simulated building product from the mold.

SUMMARY OF THE INVENTION

A demolding apparatus for removing a molded building product from a mold has a conveyor assembly which advances the mold in a machine direction. The conveyor assembly has a gripping mechanism which holds a leading edge of the mold in a cross-machine direction as the mold is advanced in the machine direction. A dislodging mechanism removes the molded building product from the mold as the mold is moved in the machine direction.

In another aspect, a removal mechanism contacts a dislodged portion of the molded building product and applies a dislodging force to the dislodged molded building product from the mold.

Various advantages of this invention will become apparent to those skilled in the art from the following detailed description of the preferred embodiments, when read in light of the accompanying drawings.

BRIEF DESCRIPTION OF THE DRAWINGS

FIGS. 5A, 5B and 5C are cross-sectional schematic illustrations of a dislodging mechanism having an engagement member at various stages of dislodging a molded building product from a mold.

FIG. 5D is a schematic perspective illustration of the embodiment of the engagement member shown in FIGS. 5A-5C.

DETAILED DESCRIPTION OF THE PREFERRED EMBODIMENTS

Figure 1:
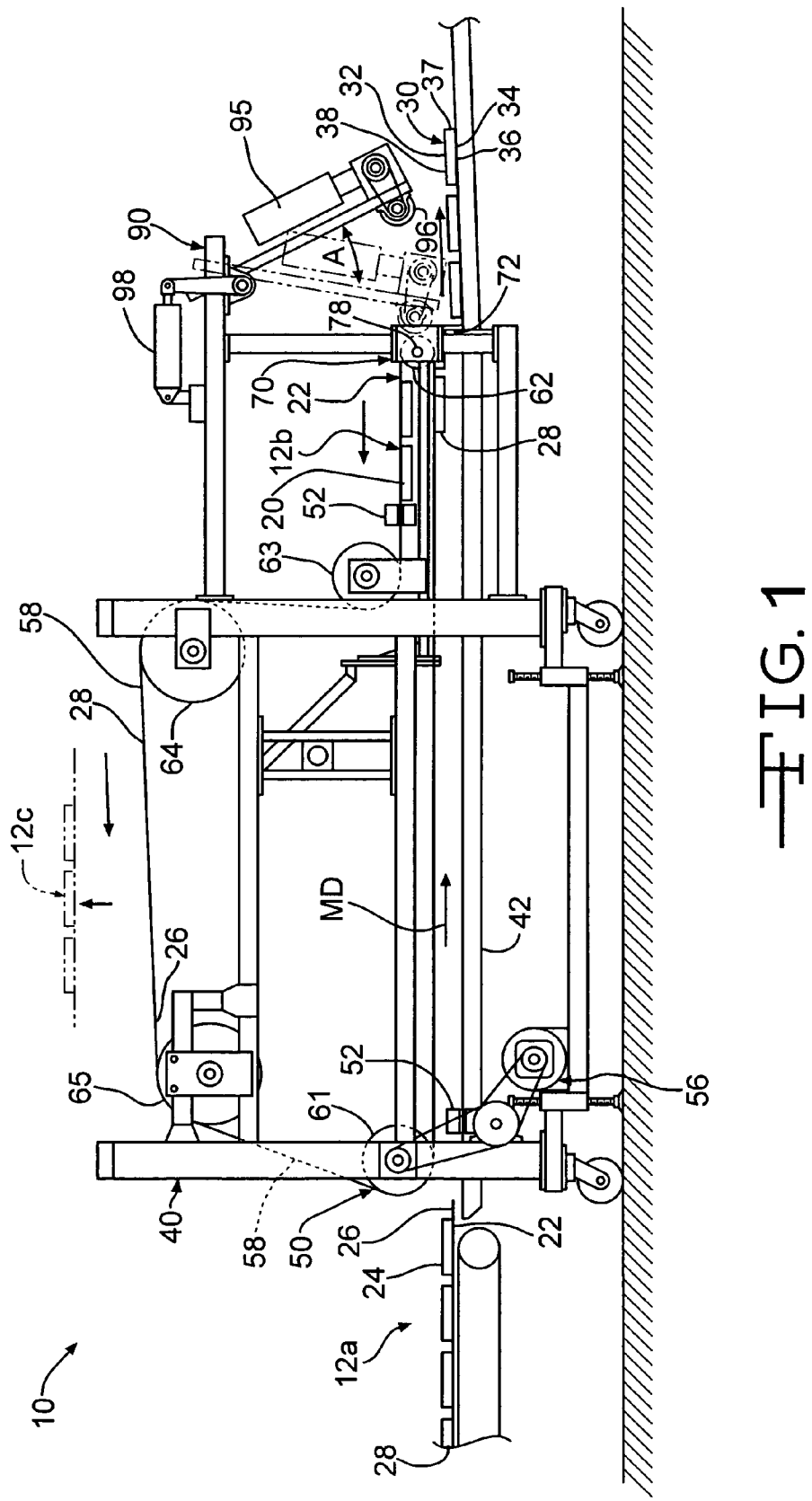
FIG. 1 is a schematic illustration showing a side elevational view, partially in phantom, of one embodiment of a demolding apparatus.

The demolding apparatus 10 shown in the figures herein is useful in the removal of molded building products 30 from a mold 12. The mold 12 includes one or more mold cavities 20. For ease of illustration, only one mold 12 and one mold cavity 20 will be discussed in detail; however, it is to be understood that the mold 12 typically contains a plurality of mold cavities 20 that are arranged therein in an efficient pattern.

Figure 2:
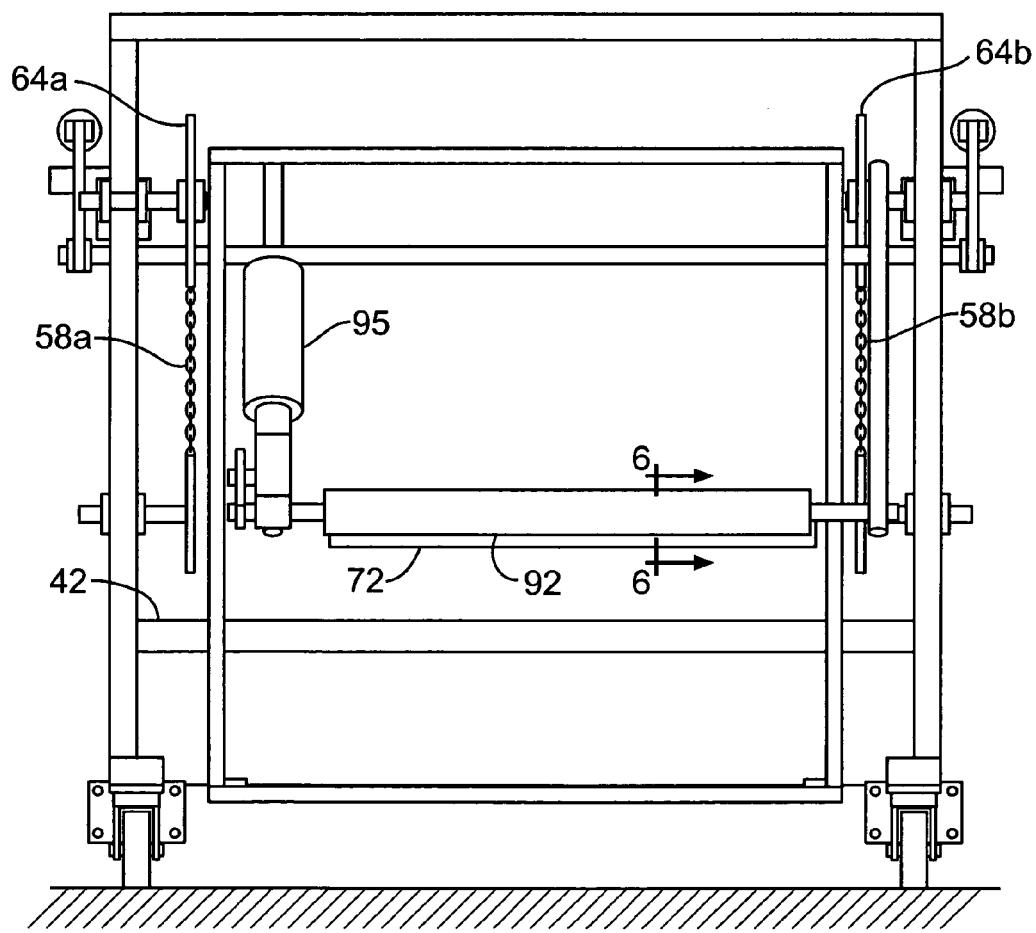
FIG. 2 is a schematic illustration showing a front elevational view of the demolding apparatus shown in FIG. 1.
Figure 3:
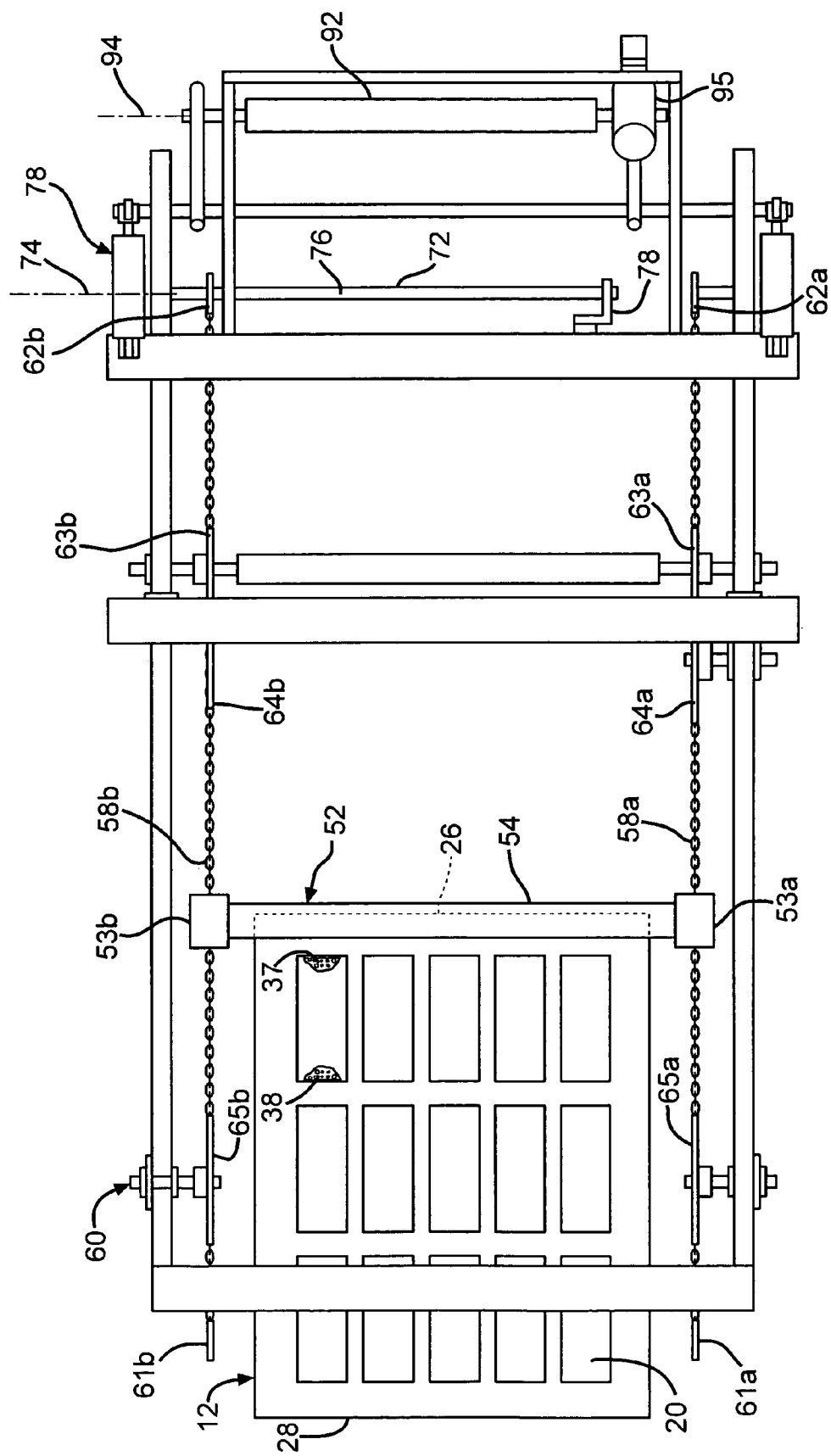
FIG. 3 is a schematic illustration showing a top plan view of the demolding apparatus shown in FIG. 1.

FIGS. 1, 2 and 3 show the demolding apparatus 10 which generally includes a mold conveyor assembly 50, an ejection member, such as an ejection roll 72, and a removal member, such as a removal roll 92. FIG. 1 also schematically shows the demolding apparatus 10 having several molds that are at different stages therein: gripping an inverted mold 12a, demolding an inverted mold 12b, and releasing an empty mold 12c, shown in phantom.

The mold 12 has a front side 22 and a back side 24. The mold 12 also has a leading edge 26 and a trailing edge 28. Each mold cavity 20 has the imprinted shape of a corresponding natural molded building product 30.

The molded building product 30 has a textured front face 32, textured side faces 34, and an untextured back face 36. For ease of further discussion herein, the molded building product 30 will also be referred to as having a first, dislodged end, or portion, 37 which is oriented toward the leading edge 26. The molded building product 30 also has a second, trailing end 38.

In certain embodiments, the demolding apparatus 10 includes a frame assembly 40 which supports a platform support member 42 over which the mold 12 is conveyed. In certain embodiments, the platform support member 42 can be a conveyor-type device which assists in moving the mold 12 in the machine direction, shown by the arrow MD in FIG. 1. In other embodiments, the platform support member 42 can be a stationary device over which the mold 12 is moved. The platform support member 42 can be made of any suitable material that will support the mold 12. In certain embodiments, the platform support member 42 can be a perforated material which allows any loose material from the molded building product 30 to pass therethrough.

In another embodiment, the platform support member 42 can be made of highly wear resistant ceramic tile.

As the mold 12 is moved onto the platform support member 42, the mold 12 is engaged by the mold conveyor assembly 50. The mold conveyor assembly 50 includes one or more gripping mechanisms 52, and a drive member 56 operatively connected to a pair of parallel spaced apart conveyors 58a and 58b, as best seen in FIGS. 2 and 3.

In an alternative embodiment (not shown), the mold 12 comprises a continuous belt conveyed through the demolding device, and the grippers and all hardware associated with discrete molds are not required. In such an embodiment, the belt may be significantly longer, to enable an operation where the concrete is poured into the molds, cured, then conveyed within the continuous belt to the device described herein for pulling, or the belt may be poured, cured, then transported to the demolding apparatus. In such an embodiment, the gripping mechanism shall be construed to comprise the belt and the associated hardware configured to move the belt as the mold is advanced in the machine direction.

The first and second conveyors 58a and 58b can have more than one gripping mechanism 52 disposed along their linear lengths so that more than one mold 12 can be advanced through the demolding apparatus 10 at the same time. For ease of illustration herein, only one gripping mechanism 52 will be discussed in detail.

The gripping mechanism 52 applies a gripping force along the leading edge 26 of the mold 12. The gripping mechanism 52 holds the leading edge 26 in a secure manner as it pulls the mold 12 through the demolding assembly 10. The gripping mechanism 52 substantially prevents the leading edge 26 from rotating so that it is no longer aligned with the machine as the mold 12 is being advanced in the machine direction.

The cross-machine gripping of the leading edge 26 by the gripping mechanism 52 allows for a substantially steady and uniform machine direction pressure exerted on the edge 26 of the mold 12. The cross-machine gripping mechanism 52 compensates for any variations that may be present in the thickness of the leading edge 26. The cross-machine gripping of the leading edge 26 overcomes previous problems with pulling molds where the continued and repeated use of the building product molds often caused a build-up of castable material and/or building product debris to accumulate on the edges of the mold 12. The gripping force applied by the gripping mechanism 52 across the leading edge 26 overcomes any of these difficulties and allows the mold 12 to be evenly advanced through the demolding assembly 10, as further explained below.

As best seen in FIG. 3, the gripping mechanism 52 has opposing spaced apart first and second mounting blocks 53a and 53b and a cross-machine gripping member 54 which extends between the first and second mounting blocks 53a and 53b. The first mounting block 53a is secured to the first conveyor 58a and the second mounting block 53b is secured to the second conveyor 58b to secure the gripping member 54 in the cross-machine direction. As shown in FIG. 3, the gripping member 54 is configured to maintain the mold 12 in the space between the conveyors 58a, 58b as the mold 12 is advanced.

In certain embodiments, the gripping member 54 can be any suitable clamp-like device that substantially secures the mold 12 to the conveyors 58a and 58b. It is within the contemplated scope of the present invention, however, that the gripping member 54 can include other types of gripping members which readily open and close on the leading edge 26 of the mold 12, or otherwise grip the leading edge 26. For example, other useful gripping members can include, but are not limited to actuator levers, camming mechanisms, opposing leaf springs, cross-machine bars embedded in the leading edge of the mold, magnetically disposed bars, and the like.

Figure 4:
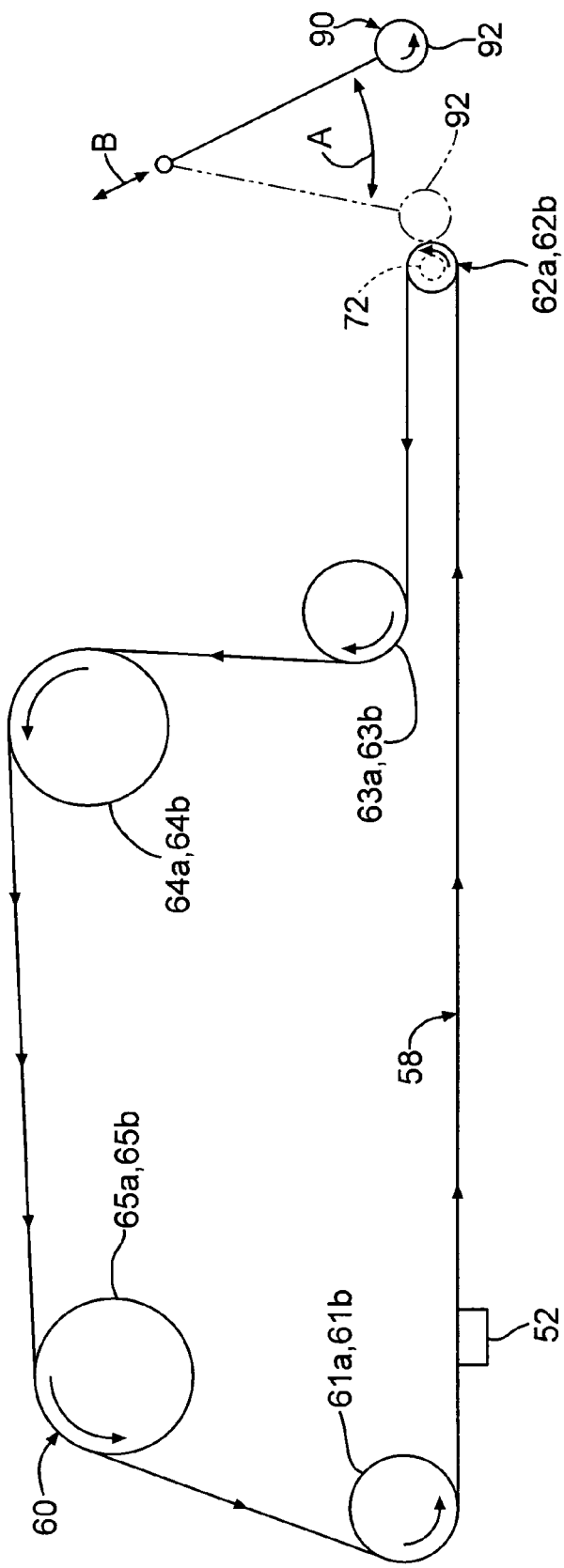
FIG. 4 is a schematic illustration in elevation of a conveyor system and a removal assembly of the demolding apparatus shown in FIG. 1.

The drive motor 56 advances the pair of oppositely disposed conveyors 58a and 58b and the mold 12, which is held by the gripping mechanism 52, over an advancing assembly 60 which defines a conveyor path. One configuration of the advancing assembly 60 is schematically shown in FIG. 4 where each of the pair of conveyors 58a and 58b forms a continuous path over the advancing assembly 60. The advancing portions of the conveyors 58a, 58b travel over first rolls 61a, 61b that are adjacent to the drive motor 56. The conveyors 58a and 58b are advanced in the machine direction toward the ejection roll 72 and around rolls 62a, 62b. The conveyors 58a and 58b then return in a reverse machine direction over one or more returning rolls 63a, 63b, 64a, 64b, 65a, 65b. It is to be understood that the conveyor path can be arranged in different configurations.

The conveyor assembly 50 and the advancing assembly 60 are operated together to advance the leading edge 26 of the inverted mold 12 toward the ejection roll 72. In the embodiment shown, the ejection roll 72 advances the mold 12 around a curved path. In certain embodiments, it has been found especially useful to invert or flex the mold 12 at an angle of at least about 100° and preferably about 160° to about 180° from the horizontal planar position in order to begin to dislodge the molded building product 30 from the mold 12.

In the embodiment shown, the ejection roll 72 is rotated about its longitudinal axis 74. In certain embodiments, the ejection roll 72 can include a resilient covering 76. In certain embodiments, the resilient covering 76 can comprise a soft foam material. The resilient covering 76 is at least partially deformed as the mold 12 is pulled around the ejection roll 72. The resilient covering 76 also allows the demolding apparatus 10 to accommodate different thicknesses of molded building product 30. Also, the resilient covering 76 protects or cushions the molded building product 30 as the molded building product 30 is being dislodged from the mold cavity 20, thus reducing breakage of the molded building product 30.

The diameter of the ejection roll 72 is determined, in part, by the size and shape of the molded building product 30 being demolded. The ejection roll 72 can be operatively mounted in the demolding apparatus 10 such that one ejection roll 72 can be replaced with a different ejection member having a different diameter in order to accommodate molds having different sized and shaped molded building products 30. For, example, in certain embodiments, the ejection roll 72 has a diameter of about 4 inches or less, while in other examples, the diameter can be greater or less than 4 inches.

The ejection roll 72 can be connected to a driving member such as a motor 78 in order to aid in advancing the mold 12 around the ejection roll 72.

Referring now in particular to the schematic illustration in FIGS. 5A-5D, the leading edge 26 of the mold 12 is advanced around the ejection roll 72. The back face 24 of the mold 12 engages the ejection roll 72. The advancing mold 12 generally flexes and at least somewhat conforms to the shape of the ejection roll 72. The molded building product 30, however, due to its rigid nature, is not flexed. The distortion, or flexing, of the mold 12 around the ejection roll 72 initially forces at least a portion 37 of the molded building product 30 to be dislodged from the mold cavity 20. As shown in FIG. 5C, the removal roll 92 applies a dislodging force to the dislodged portion 37 of the molded building product 30 while the remainder of the molded building product 30 remains inside the mold 12.

In embodiments having the resilient covering 76 on the ejection roll 72, the molded building product 30 pushes against the covering 76. The covering 76 allows the mold 12 to be stretched or distorted sufficiently to at least partially dislodge the molded building product 30 without allowing the molded building product 30 to damage or tear the mold 12 itself.

As the dislodged portion 37 of the molded building product 30 is ejected from the mold cavity 20, the molded building product 30 is forced into a somewhat tangential relationship with respect to the ejection roll 72. The molded building product 30, however, continues to be advanced in the machine direction. In certain embodiments, the molded building product 30 is also somewhat rotated in a generally upward direction. At least momentarily, the molded building product 30 remains lodged in the mold 12 due, at least in part, to the continued engagement of the second or trailing end 38 of the molded building product 30 within the mold cavity 20.

As the mold 12 advances around the ejection roll 72, the mold 12 is peeled away from the molded building product 30. The mold 12 is continued to be forced against the ejection roll 72. In certain embodiments, the mold 12 is flexible and elastomeric such that the mold 12 is at least partially flattened against the ejection roll 72. The ejection roll 72, however, has a sufficient stiffness such that the molded building product 30 is at least partially forced from the mold cavity 20.

The leading edge 26 of the mold 12 is moved in a forward machine direction, then upward and, finally backward in a return machine direction around the ejection roll 72. Meanwhile, the molded building product 30 continues in the forward machine direction and the first, or dislodging portion 37, is at least partially pulled from the mold cavity 20.

The leading edge 26 of the mold 12 is then advanced in the return machine direction. The molded building product 30 continues in a generally straight, or tangential, direction with respect to the ejection roll 72 due to the rigid shape of the molded building product 30. However, there may be a tendency for the molded building product 30 to ride upward to follow the mold 12.

The ejection roll 72 also exerts a force on the back 24 of the mold 12 as the mold 12 is advanced around the ejection roll 72. That is, the mold cavity 20 experiences the necking, or Poisson, effect where the mold 12 undergoes a longitudinal expansion which, in turn, causes the mold 12 to somewhat contract in the lateral direction.

The mold 12 is also somewhat flattened against the ejection roll 72. While the flattening of the mold 12 against the ejection roll 72 somewhat overcomes this Poisson effect, both the Poisson effect and the adhesive force of the mold 12 against the molded building product 30 often cause the molded building product 30 to remain at least partially lodged in the mold cavity 20.

As the molded building product 30 continues in the machine direction, the dislodged portion 37 is contacted by the removal roll 92. The removal roll 92 is rotated about its longitudinal axis 94 by a drive member 95 in a counterclockwise direction, as viewed in FIG. 5A. In certain embodiments, the removal roll 92 can include one or more flexible engagement members 96 circumferentially mounted on the removal roll 92. The removal roll 92 is operatively engaged to apply a dislodging force to the dislodged portion 37 of the molded building product 30.

The removal roll 92 exerts a generally downward force on at least the dislodged portion 37 of the molded building product 30. In embodiments where the engagements member 96 are present, the advancing molded building product 30 pushes against the engagement members 96, thus gradually temporarily deforming them. Simultaneously, however, the engagement members 96 cause a gradually increasing amount of dislodging force to be exerted in a direction counter to the tangential upward movement of the molded building product 30. The removal roll 92 exerts a sufficient force to completely dislodge the molded building product 30 from the mold cavity 20. The molded building product 30 is then completely dislodged from the mold cavity 20 without allowing the molded building product 30 to damage or tear the mold 12.

Referring again to FIGS. 1-4, in certain embodiments, the removal roll 92 can include a positioning assembly 98 for moving the removal roll 92 into a desired position adjacent the ejection roll 72, as shown by the arrows A and B in FIG. 4. The removal roll 92 can also be movably positioned relative to the conveyor assembly 50 for accommodating different shaped molds, as shown by arrows A and B in FIG. 5B. In certain embodiments, the removal roll 92 and the ejection roll 72 are mounted in a parallel, yet separate horizontal planar relationship, as shown in FIG. 5B. In other embodiments, the removal roll 92 is mounted in both a horizontal planar and parallel relationship to the ejection roll 72, as shown in FIG. 5A.

Also, in certain embodiments, the removal roll 92 can be mounted in a somewhat vertical reciprocating manner to apply an intermittent dislodging force to the dislodged portion 37 of the molded building product 30. The removal roll 92 can be repeatedly and rapidly reciprocated in the direction of arrow A, as shown in FIG. 4.

Referring again to the schematic illustrations in FIGS. 5A-5C, the removal roll 92 contacts dislodged portion 37 of the molded building product 30 and forces the molded building product 30 in a downward direction away from the mold 12. The dislodging force is supplied to the molded building product 30 at the points where the molded building product 30 disengages from the mold 12. Since the molded building product 30 is also simultaneously being advanced in the machine direction, dislodging forces are also being applied to counter the adhesive force being applied by the mold 12 on the molded building product 30. The removal roll 92 forces the molded building product 30 from the mold 12, thereby overcoming both the Poisson effect and the adhesive effect.

In the embodiment shown, the ejection roll 72 and the removal roll 92 are both rotated in a counterclockwise direction, as shown in the drawings. As the removal roll 92 continues to rotate in the counterclockwise direction, the removal roll 92 pushes the molded building product 30 both in a downward direction, and then as the removal roll 92 continues to engage the dislodged portion 37, in the forward machine direction.

In certain embodiments, as shown in FIGS. 5A-5C, the removal roll 92 further includes the engagement member 96 which is brought into contact with the dislodged portion 37. The engagement member 96 exerts the dislodging force in a generally downward direction on the dislodged portion 37 of the molded building product 30.

As shown in FIG. 5D, the engagement member 96 can include an array of contacting members 100 longitudinally aligned on the removal roll 92 in the cross-machine direction. The contacting members 100 are configured to exert downward dislodging forces to the dislodged portion 37 of the molded building product 30.

In the embodiment shown in FIG. 5D, the engagement member 96 includes one or more rows 102 of the contacting members 100. Also, in certain embodiments, the rows 102 of contacting members 100 comprise tangentially disposed rows of independently disposed flaps 104. In a further alternative embodiment, such flaps comprise brushes. While the embodiment shown in FIGS. 5A-5D is illustrated as having four rows 102, in other embodiments, fewer or greater numbers of rows 102 can be used to exert the desired dislodging forces on the molded building product 30.

In the embodiment in FIGS. 5A-5C, the flaps 104 are disposed along an outer circumference of the removal roll 92 and extend in a tangential manner to the outer circumference thereof. The flaps 104 have a sufficient stiffness to provide the necessary dislodging forces onto the dislodged portion 37 of the molded building product 30. The flaps 104 also have a desired flexibility so that each flap 104 can come into contact with individual molded building products 30 in the mold 12.

As the removal roll 92 is rotated, the flaps 104 come into contact with the advancing molded building product 30. The removal roll 92 is optionally rotated at a desired speed such that one or more rows 102 of flaps 104 contacts the dislodged portion 37 of the advancing molded building product 30. Each row 102 of flaps 104 then exerts the desired dislodging forces against the molded building product 30.

When the removal roll 92 is rotated at certain speeds, the tangentially advancing rows 102 of flaps 104 continue to contact the molded building product 30 such that each row 102 of flaps 104 provides intermittent dislodging forces against the dislodged portion 37 of the molded building product 30.

The adjacent flaps 104 allow individual dislodging forces applied on the desired dislodged portions 37 of the molded building products 30. In certain embodiments, the flaps 104 have a desired longitudinal width 106 so that adjacent flaps 104 within the same row 102 can contact different molded building products 30, or portions of one molded building product 30. For example, when broad, flat molded building products are oriented in the cross-machine direction, a first flap 104 can contact a corner of the molded building product 30 while the adjacent, second flap 104 can contact an adjacent portion of the molded building product 30. Likewise, an adjacent, third flap 104 can contact an opposing dislodging corner of an adjacent, similarly situated molded building product 30 in the mold 12. In another example, (not shown) long and narrow molded building products 30 (often having different lengths) are oriented in the machine direction in the mold 12 such that the narrow end of the molded building product 30 is advanced toward the removal roll 92. As such a mold approaches the removal roll 92, a first flap 104 can contact the leading portions 37 of more than one first narrow molded building product while the adjacent second flap 104 can contact still other molded building products. In such molds 12 that contain long and narrow molded building products 30, the repeated dislodging forces being applied to the advancing and dislodging portion 37 of the molded building product 30 provides the necessary force to completely dislodge the molded building product 30 without damaging either the molded building product 30 or the mold 12.

As the molded building product 30 continues to be advanced in the machine direction, the second end, or trailing portion, 38 of the molded building product 30 then is also dislodged from the mold 12.

Thus, combined forces are applied to the molded building product 30: i) the tangentially directed dislodging force of the flaps 104 against the dislodged portion 37; ii) the advancing machine direction force of the molded building product 30 against the flaps 104; iii) the pushing force of the ejection roll 72 against the back 24 of the mold 12; and, iv) the force on the trailing end 38 of the molded building product 30 against the platform support member 42 in a direction perpendicular to the machine and cross-machine directions. The combined forces work to pull (i.e., dislodge) the molded building product 30 from the mold 12.

Figure 6:
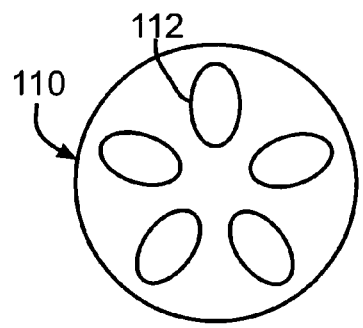
FIG. 6 is a cross-sectional illustration of another embodiment of a removal assembly.

FIG. 6 shows another embodiment of an engagement member 110 which comprises a resilient or elastomeric member such as a soft foam material. The resilient engagement member 110 is at least partially deformed as the dislodging portion 37 comes into contact with the resilient engagement member 110. The resilient engagement member 110 also allows the demolding apparatus 10 to be able to accommodate different thicknesses of molded building products 30. Also, the resilient engagement member 110 protects or cushions the molded building product 30 as the molded building product 30 is being dislodged from the mold cavity 20, thus reducing breakage of the molded building product 30. The diameter of the resilient engagement member 110 is determined, in part, by the size and shape of the molded building product 30 being demolded. Also, in certain embodiments, the resilient engagement member 110 can include hollow spaces 112 to provide further resiliency.

The demolding apparatus 10 increases the manufacturing capacity for simulated molded building products. The demolding apparatus 10 also has the capacity to process molds that have a greater square footage of molded building products per mold than previous molds. The demolding of the simulated molded building products using the demolding apparatus 10 and the method described herein also decreases the demolding cycle time and decreases the scrap and breakage rate. The demolding apparatus also provides a cleaning action to the molds.

While the invention has been described with reference to a preferred embodiment, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A demolding apparatus for removing a molded building product from a mold comprising:
   a conveyor assembly configured to continuously advance the mold in a horizontal machine direction and then to continuously direct the mold around an upward curve, the upward curve being structured to cause the mold to follow the curve, and subsequently to direct the mold in a reverse machine direction, the conveyor assembly being structured to cause a portion of the molded building products to become dislodged as the mold moves continuously around the curve; and,
   a removal mechanism configured to contact the dislodged portion of the molded building product and to apply an intermittent dislodging force to the dislodged portion of the molded building product while the remainder of the molded building product remains in the mold.

2. The demolding apparatus of claim 1, wherein the removal mechanism includes an engagement member mounted in a cross-machine direction, the engagement member being configured to exert dislodging force in a generally downward direction on the dislodged portion of the molded building product.

3. The demolding apparatus of claim 1, wherein the removal mechanism is mounted on a positioning assembly configured to enable the removal mechanism to be moved to accommodate different shaped molds.

4. The demolding apparatus of claim 1, further including a rotatably mounted ejection member configured to advance the mold around a curved path.

5. The demolding apparatus of claim 4, wherein the ejection member is connected to a driving member for advancing the mold around the ejection member.

6. The demolding apparatus of claim 4, wherein the removal mechanism is mounted in a parallel relationship to the ejection member.

7. The demolding apparatus of claim 1, wherein the conveyor assembly is configured to move the molded building product in the machine direction as the molded building product is being dislodged.

8. A demolding apparatus for removing a molded building product from a continuous flexible mold, the demolding apparatus comprising:

a conveyor assembly configured to carry a continuous flexible mold, the mold having mold cavities containing molded building products, the mold cavities having mold openings, the conveyor assembly being configured to carry the mold in an inverted orientation having the mold openings facing a downward direction, the conveyor assembly configured to advance the mold in a horizontal machine direction and then to direct the flexible mold around an upward curve, the upward curve being structured to cause the flexible mold to follow the curve and to cause a portion of the molded building product to become dislodged from a leading edge of the mold while the molded product is still traveling in a substantially horizontal direction, the conveyor assembly further configured to subsequently direct the mold in a reverse machine direction; and a removal mechanism mounted to apply a reciprocating downward dislodging force to the dislodged portion of the molded building product, the dislodging force being sufficient to prevent the molded building product from following the curve.

9. The demolding apparatus of claim 8, wherein the engagement member comprises an elastomeric member.

10. The demolding apparatus of claim 8, wherein the engagement member comprises an array of contacting members arrayed in the cross-machine direction, the contacting members being configured to exert downward dislodging forces to the dislodged portion of the molded building product.

11. The dislodging apparatus of claim 9, wherein the engagement member includes one or more rows of the contacting members.

12. The dislodging apparatus of claim 11, wherein the rows of contacting members comprise tangentially disposed rows of flaps.

13. The demolding apparatus of claim 8, wherein the removal mechanism is configured with a series of flaps.

14. The demolding apparatus of claim 13, wherein the series of flaps has sufficient stiffness to completely remove the molded building product from the mold.

15. The demolding apparatus of claim 8, wherein the removal mechanism is configured with a series of flaps that directly contact the dislodged portion of the molded building product.

16. The demolding apparatus of claim 8 in which the curve is formed by an ejection roll, and the conveyor assembly is configured to flex the mold around a circumferential angle of at least about 100 degrees.

17. The demolding apparatus of claim 16 in which the conveyor assembly is configured to flex the mold around a circumferential angle of at least about 160 degrees.

18. The demolding apparatus of claim 16 in which the ejection roll includes a resilient covering.

\* \* \* \* \*